June 29, 1954   H. PELPHREY   2,682,100
GEAR SHAVING CUTTER
Filed Nov. 8, 1951   2 Sheets-Sheet 1
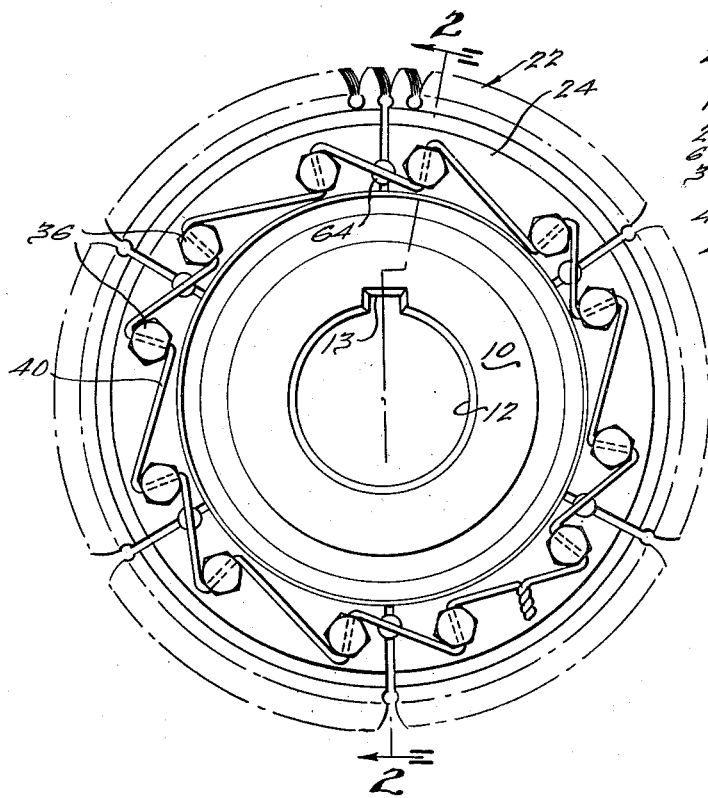
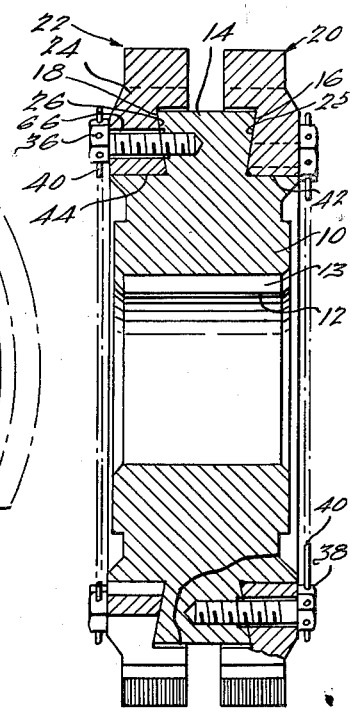
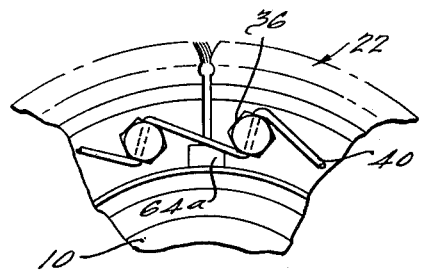
INVENTOR.
Harry Pelphrey.
BY
Harness, Dickey & Pierce
ATTORNEYS.

June 29, 1954  H. PELPHREY  2,682,100
GEAR SHAVING CUTTER
Filed Nov. 8, 1951  2 Sheets-Sheet 2
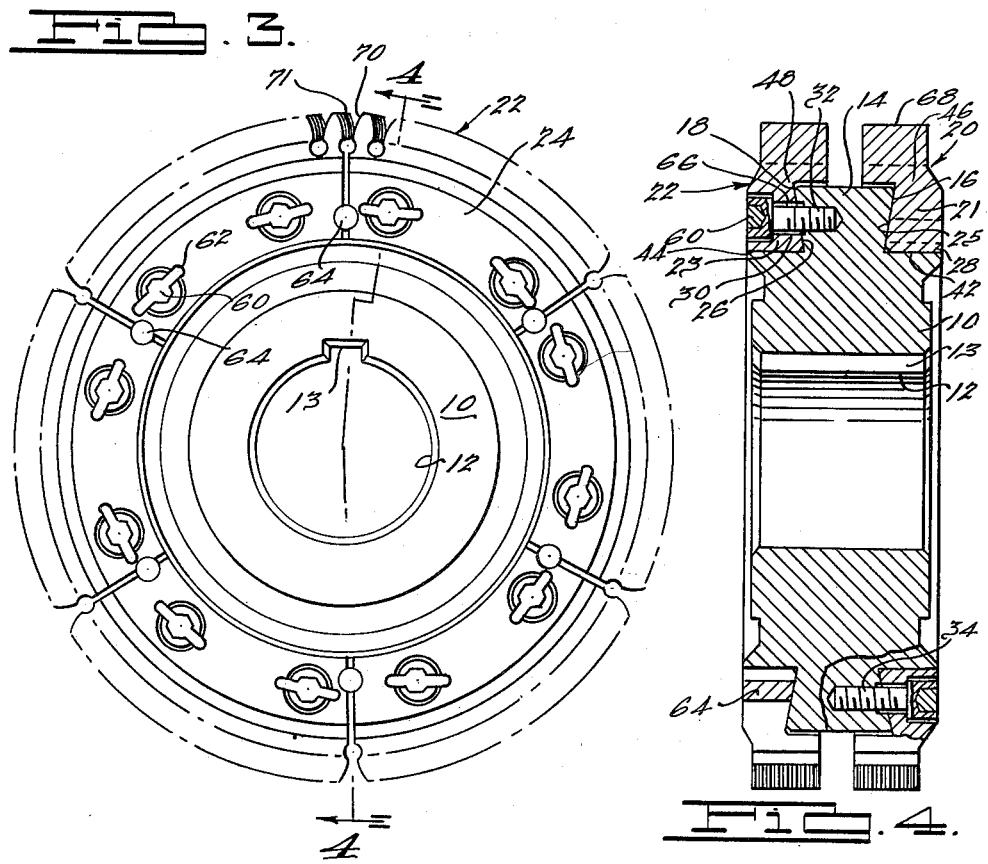
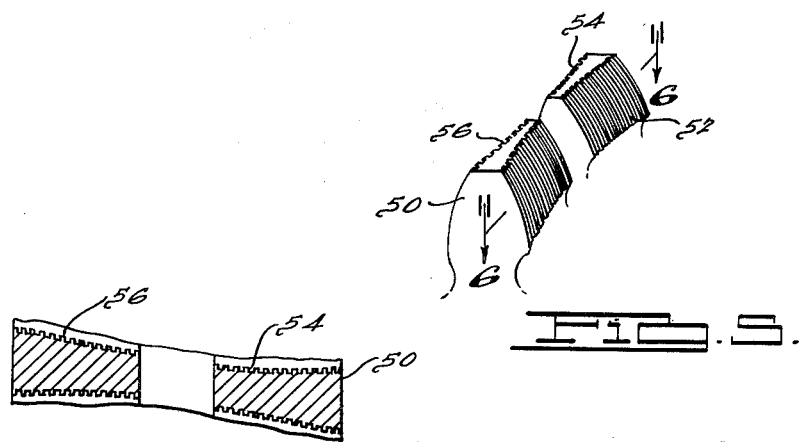
INVENTOR.
*Harry Pelphrey.*
BY
*Harness, Dickey & Pierce*
ATTORNEYS.

Patented June 29, 1954

2,682,100

UNITED STATES PATENT OFFICE 2,682,100

GEAR SHAVING CUTTER

Harry Pelphrey, Detroit, Mich., assignor to Michigan Tool Company, Detroit, Mich., a corporation of Delaware Application November 8, 1951, Serial No. 255,417

5 Claims. (Cl. 29—105)

The present invention relates to rotary finishing tools and more particularly relates to double segmented shaving cutters having a pair of peripheral cutting portions each of which is fabricated from a plurality of truncated sectors.

The customary method of finishing roughedout gears is to run them in mesh with a shaving cutter having cutting edges extending generally up and down the faces of the teeth, while the axis of rotation of the cutter is inclined materially to the axis of rotation of the gear. It is well known that this method of shaving gears provides an area of contact between the cutter and the gear being shaved which is relatively narrow so that it is necessary to translate one of the gears in relation to the other in order to obtain uniform cutting on the gear face. It is also known that as shaving cutters are increased in size, the difficulties of manufacture become more pronounced and that it is often necessary to discard entire cutters when one tooth or a few teeth are rendered defective.

In accordance with this invention, large rotary shaving cutters are provided, featuring a pair of cutting portions, fabricated from a plurality of truncated sectors, which substantially increase the zone of area of instantaneous contact with the gear being shaved and thereby are beneficially effective in correcting the lead or helix angle of the gear. Each of the pair of cutting portions is constructed from a plurality of individually detachable truncated sectors rigidly mounted on an inner gear body, the mounting being sufficiently rigid so as to effectively present a unitary cutter having all of the desirable attributes of heretofore known designs and at the same time providing advantages not heretofore known; for example, the ability to be easily and quickly disassembled, to enable replacement of a sector having a defective tooth thereby saving the loss of an entire cutter and reducing the down-time in the operation of mass production shaving machines.

It is one of the objects of this invention to provide a rotary gear finishing tool having a pair of outer cutting portions fabricated from a plurality of truncated sectors.

It is another object of the present invention to provide a gear shaving tool which combines the features of replaceable sectors with cutting teeth having the working surfaces thereof modified to effectively increase the zone of area of instantaneous contact with the gear being shaved when the axis of rotation of the cutter is inclined to the axis of rotation of the gear.

Still further, the invention contemplates the provision of an inner cutting body having a pair of cutting portions detachably secured thereto with each cutting portion being fabricated from a plurality of truncated sectors and there being a slot between the cutting portions located in the axial central portion of the gear body.

The above and further objects and advantageous features of the invention will become apparent upon considering the full description of the invention in its entirety.

In the drawings:

Figure 1 is a side elevation of an assembled gear finishing tool embodying the features of this invention;

Figure 2 is a sectional view of the structure illustrated in Figure 1 taken substantially on the line 2—2 thereof and looking in the direction of the arrows;

Figure 3 is an elevation view of the structure shown in Figure 1 showing a modified form thereof;

Figure 4 is a sectional view of the structure illustrated in Figure 3 taken substantially on the line 4—4 thereof and looking in the direction of the arrows;

Figure 5 is an enlarged perspective view showing the serrated teeth of the structure of Figures 1 and 3;

Figure 6 is a sectional view of the teeth of Figure 5 taken substantially on the line 6—6 thereof and looking in the direction of the arrows; and Figure 7 is a broken side view of the structure shown in Figure 1 showing a modified form thereof.

Referring more particularly to the drawings, there is shown in Figure 1 an inner gear body 10 having a central aperture 12 therethrough provided with a keyway 13 adapted to enable body 10 to be mounted on a shaft for rotation. Body 10 is provided with an outwardly extending annular bell-mouthed portion 14 having oppositely disposed surfaces 16 and 18 adapted to support and rigidly mount cutter portions 20 and 22, respectively. Surfaces 16 and 18 are angularly disposed to the vertical axis of body 10 as hereinafter will be more fully discussed.

Assembled cutting elements 20 and 22, for the purposes of this invention, may be identical annular elements. Each cutting element is comprised of a plurality of truncated sectors 24 which are mounted on and supported by bell-mouthed portion 14. As may best be seen in Figures 2 and 4, the cutting elements 20 and 22 are provided with inwardly projecting flange portions 21 and 23, respectively. The inner surfaces 25 and 26 of flanges 21 and 23, respectively, are angularly disposed to the axis of body 10, an amount which is preferably the same as that provided on surfaces 16 and 18 of the bell-mouthed portion 14. Flange portions 21 and 23 are provided with apertures 28 and 30 adapted to accomodate securing means, such as screws 32, 34. Similarly, bell-mouthed portion 14 is provided with aligned apertures adapted to threadably engage the inner extremities of screws 32, 34. For the purpose of insuring against dis-assembly during operation, the outward projections 36 and 38 of securing means 32, 34 are provided with apertures therethrough adapted to accommodate a locking member 40, or the like. Locking member 40 may be an individual pin for each securing means 32, 34 or, if desired, may be one continuous circular locking member, such as a removable wire. It will be apparent that as securing means 32, 34 are tightened flange portions 21, 23 conjugate to surfaces 16, 18 will be drawn tightly thereagainst and will be securely seated against surfaces 42, 44 of the body 10.

The angular disposition of surfaces 25 and 26 conjugate to surfaces 16 and 18 tends to cause truncated sectors 20, 22 to move toward surfaces 42, 44 respectively, and to be forcibly seated thereagainst both during tightening and as a result of the pressures which are generated during the shaving operation. The angle of inclination from the vertical axis of body 10 of surfaces 16, 18, 25 and 26, is not critical inasmuch as any degree of angularity is of advantage to secure a rigid assembly. Care should be taken, however, to insure that the cross-sectional dimension 46, 48 of flanges 20, 22 is not reduced to a degree such that failure will occur during use. The surfaces 16, 18 when disposed to the vertical axis of body 10 at angles between about 5° and 30° provide satisfactory rigidity and stability and an angular disposition of approximately 10° is preferred.

Sectors 20, 22 are provided with a plurality of teeth 50 on the periphery thereof. Each of the working surfaces 52 of each of the teeth 50 is provided with a plurality of generally vertically arranged closely spaced serrations 54 separated by lands 56. Teeth 50 are basically different from conventional gear shaving tool teeth which are of true involute and uniform cross-section throughout their entire transverse width in that teeth 50 are of materially less thickness in their axial inner portions, that is, the portions lying adjacent to the vertical axis of body when the tool is assembled. The lands adjacent to the outer axial end of each tooth are of a form substantially identical with that of conventional shaving cutters—that is to say, these lands are of uniform thickness and conventional true involute form.

The number of actual lands having true involute form is not any specific quantity for it will be appreciated that variations may occur as the size of the tool increases or decreases. In any event it is preferred that the area of true involute form adjacent to the axial end of each tooth be of substantial axial width and include not less than two lands. The lands adjacent to the last-mentioned outer lands are gradually tapered toward the axial central portion of body 10. From the end adjacent to the axial central portion of the gear body 10, each tooth 50 is ground on each of the opposite sides thereof to decrease the circumferential thickness thereof so that each tooth will be of a minimum circumferential thickness in the area adjacent to the axial central portion of the gear body 10. Interposed between the lands of minimum circumferential thickness is an area of tapered circumferential thickness which gradually blends into the area or zone of the outer lands at a point substantially inwardly from the axial end of each tooth. It will be appreciated that the actual magnitude of the decrease in thickness of the teeth will vary quite widely depending upon the size of the tool and the nature of the shaving operation, but, in any event, it will be an extremely small amount and in the usual case will vary from a few tenths of a thousandth of an inch up to one to two thousandths of an inch. It would, of course, be possible to taper the teeth completely to the axial end surfaces, but the best results have been obtained when the tapered area terminates at a point substantially inwardly from the axial end surface of the tooth. Apparently the zone of contact with the gear being finished is, in the preferred form of this invention, elongated such that the cutting action is uniform throughout the entire transverse width of the area of contact of the meshed teeth. The lands in the outer axial end portion of the teeth lying in the true involute tend to maintain and to correct the helix angle of the gear being finished. The teeth 50 are separated at the root portions thereof by transversely extending cylindrical holes 58 which act as avenues for the flow of lubricant past the cutter to assist in carrying off the shavings or chips produced in the shaving operation.

A modification of the cutter illustrated in Fig. 1 is shown in Fig. 3 wherein the method of attaching the truncated sectors 20, 22 to the body 10 is modified by eliminating radially projecting portions 36, 38 and locking member 40. As there shown, securing member 34 is provided with a recessed head portion 60 and grooves 62 extending transversely across recessed portion 60. The cavity formed by the recessed head portion 60 and the grooves 62 may be filled with a low melting-point, metallic material such as silver solder, or the like. It will be apparent that by this means, a positive locking of cutting members 20, 22 to flange 14 by bolts 34, 32 is assured. Dis-assembly may be accomplished by simply heating the low melting-point material and removing the same from the recessed portion 60 and thereafter detaching securing means 32, 34.

The shaving cutter of this invention may be assembled by positioning the individual truncated sectors 24 on the supporting flange 14 in their approximate relationship, and inserting spacers 64 between each sector 24 and thereafter tightening the bolts 34, 32 to secure each sector in place. Inasmuch as some variation will inherently result from the formation of the sectors 24, assembling tolerance is provided in the form of an oversize portion 66 in the flange portions 20, 22 to enable slight shifting of the sectors relative to the body 10 to produce a symmetrical assembly. It will be appreciated that the shape of spacers 64 may be varied to enable the use of rectangular spacer 64a, square spacers, or relatively flat spacers, the rectangular modification being illustrated in Fig. 7. While it is possible to eliminate spacers entirely, it will be appreciated that manufacturing tolerances can be somewhat increased when spacers are used and their inclusion is therefore preferred.

Prior to the use of tools of the type and form described above, it will be obvious that it is necessary to grind the working flanks 52 as well as the peripheral surface 68 of each of the cutting elements 20, 22 to insure that the contiguous working flanks 70 and 71 at the ends of adjacent sectors 24 are properly spaced.

It is to be understood that although teeth 50 tapered as previously described, represent the preferred form of the invention, the beneficial effects are nevertheless derived from the detachable truncated sector construction of the cutting elements, 20, 22 regardless of the form of the teeth 50. Conventional tooth form on elements 20, 22 is therefore contemplated by this invention.

While only two embodiments of the invention have been shown and described, it will be apparent that various minor changes, additions, and omissions may be made without departing from the spirit and scope of the invention as defined in the following claims.

What is claimed is:

1. A rotary gear finishing tool comprising an annular body member having radially projecting means adapted for receiving a cutting element, a cutting element mounted on said means, said cutting element consisting of a pair of cutting members disposed on each side of said radially projecting means, each of said pair being made up of a plurality of individually detachable truncated sectors, each said sector having a plurality of teeth on the periphery thereof, the working flanks of said teeth having a multiplicity of closely spaced serrations and lands disposed thereon, said cutting members having a space between the inner ends thereof.

2. A rotary gear finishing tool comprising an annular body member having radially projecting means adapted for receiving a cutting element, a cutting element mounted on said means, said cutting element consisting of a pair of cutting members, each of said pair being made up of a plurality of individually detachable truncated sectors, each said sector having a plurality of teeth on the periphery thereof, the working flanks of said teeth having a multiplicity of closely spaced serrations and lands disposed thereon, said cutting members having a space between the inner ends thereof, lands adjacent to the axial end of said tooth lying in and defining a true, normal, involute surface, and lands disposed axially inwardly from these said lands defining the true, normal, involute surface of decreasing circumferential thickness in the direction from the axial ends toward the axial center of said tooth.

3. A rotary gear finishing tool comprising an inner body member and a pair of cutting members disposed on the periphery of and secured to said body member, each of said cutting members being made up of a plurality of detachable truncated sectors, each said sector having a plurality of teeth on the periphery thereof, the working flanks of said teeth having a multiplicity of closely spaced serrations and lands disposed thereon, each of said cutting members extending axially inwardly from the side face of said body to a point spaced from the vertical axis of the said body thereby defining a slot between said cutting members in the axial central portion of said body, lands adjacent to the axial end of said tooth lying in and defining a true, normal, involute surface, lands disposed axially inwardly from the said lands defining the said true, normal, involute surface of uniformly decreasing circumferential thickness, said axially inwardly disposed lands being of minimum circumferential thickness in the axial central portion of said tooth and gradually approaching and smoothly blending into the said true, normal, involute surface at a point substantially inwardly from the axial end of said tooth.

4. A rotary gear finishing tool comprising an annular body member adapted for mounting on a central shaft and having a radially extending bell-mouthed flange thereon, the radial surfaces of said flange being angularly disposed to the vertical axis of said tool, a pair of annular cutting elements mounted on said flange, each of said pair being formed of a plurality of truncated sectors, said cutting elements having an inwardly projecting flange conjugate to the said bell-mouthed flange, and securing and locking means rigidly attaching each of said cutting elements to said body member.

5. A rotary gear finishing tool in accordance with claim 4 wherein the angular disposition of the surfaces of the said bell-mouthed flange from the vertical axis of said body is within the range of 5° to 30°.

References Cited in the file of this patent

UNITED STATES PATENTS

| Number | Name | Date |
|---|---|---|
| 2,214,225 | Drummond | Sept. 10, 1940 |
| 2,228,965 | Miller | Jan. 14, 1941 |
| 2,228,966 | Miller | Jan. 14, 1941 |
| 2,267,181 | Wildhaber | Dec. 23, 1941 |
| 2,298,471 | Drummond | Oct. 13, 1942 |
| 2,392,278 | Wildhaber | Jan. 1, 1946 |

OTHER REFERENCES

Dudley, abstract of application Serial No. 789,249, published Nov. 22, 1949, 628 O. G. 1202.